(12) United States Patent
Jiang

(10) Patent No.: US 6,459,737 B1
(45) Date of Patent: *Oct. 1, 2002

(54) METHOD AND APPARATUS FOR AVOIDING REDUNDANT DATA RETRIEVAL DURING VIDEO DECODING

(75) Inventor: Hong Jiang, El Dorado Hills, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/307,087

(22) Filed: May 7, 1999

(51) Int. Cl.$^7$ ............................................. H04N 7/12
(52) U.S. Cl. .................................................. 375/240.25
(58) Field of Search ........................ 375/240.25, 240.26; 348/407.1; 711/200; H04N 7/12

(56) References Cited

U.S. PATENT DOCUMENTS 5,781,239 A * 7/1998 Mattela et al. ......... 375/240.25
5,990,958 A * 11/1999 Bheda et al. ............ 348/407.1
6,002,441 A * 12/1999 Bheda et al. .......... 375/240.26
6,226,730 B1 * 5/2001 Murdoch et al. ........... 711/200

FOREIGN PATENT DOCUMENTS

EP   0673171 A2   3/1995
EP     077207 A2  10/1996

OTHER PUBLICATIONS

Nass, R., "Secondary Cache–Memory Technique Enhances Graphics Performance", Electronic Design, Penton Publishing, Cleveland, OH, USA, vol. 41, No. 16, Aug. 5, 1993, p. 36, 38 XP000387704, ISSN: 0013–4872.

* cited by examiner

Primary Examiner—Young Lee
(74) Attorney, Agent, or Firm—Blakely, Sokoloff, Taylor & Zafman LLP

(57) ABSTRACT

A method and apparatus for decoding compressed video in a system with a central processing unit (CPU) coupled to a graphics controller, the method arising from the following steps. First, decode a first portion of a first frame using the CPU to produce a first data. Next, generate a first signal. Then, perform motion compensation using the first data and the graphics controller in response to the first signal. Next, generate a second signal. Then, decode a second portion of the first frame using the CPU to produce a second data in response to the second signal. Next, generate a third signal. Then, perform motion compensation using the second data and the graphics controller in response to the third signal.

26 Claims, 2 Drawing Sheets

METHOD AND APPARATUS FOR AVOIDING REDUNDANT DATA RETRIEVAL DURING VIDEO DECODING

BACKGROUND OF THE INVENTION

1. Field of the Invention

The present invention relates to the field of video decoding; more particularly, the present invention relates to a method and apparatus for decoding compressed video.

2. Description of Related Art

Video data is often compressed to reduce the amount of storage space consumed. One standard for video compression is Motion Picture Experts Group 2 (MPEG2). Compression standards typically employ well-known techniques such as spatial transform based compression and temporal motion estimation based compression. Consequently, the decoding process that converts compressed data to uncompressed (decoded) data consists of transform decoding and motion compensation reconstructions. The transform decoding includes variable length decoding, inverse quantization, and inverse discrete cosine transforms (IDCT). The transform decoding process typically produces commands, motion vector data, and correction data. Then, motion compensation is performed by executing the commands on the motion vector data and correction data to produce a frame for display.

In one method of decoding compressed video, a general purpose central processing unit (CPU) performs the transform decoding and motion compensation. However, the performance of the CPU may not be sufficient to perform the transform decoding and motion compensation in order to play back the video without pauses. Particularly, the performance of motion compensation on a general purpose CPU is limited by the memory subsystem and does not scale well as the performance of the general purpose CPU increases.

When performing a decoding of a frame of MPEG2 data, the frame of compressed video is copied from a storage medium, such as a Digital Video Disk (DVD), to system memory for processing by the CPU. A frame of correction data with 720 picture element (pixel) by 480 pixel resolution and 16-bit precision contains about 1 megabyte (MB) of data. Since the size of a typical level 1 (L1) cache is about 16 kilobytes (K) and the size of a typical level 2 (L2) cache is about 512 K, the entire frame of correction data cannot be stored in either the L1 or L2 caches. Cache hit rates for transform decoding can be as low as 20 percent. Thus, many data accesses during the transform decoding process are retrieved from slower system memory rather than the faster cache memories. Low cache hit rates reduce playback performance.

Generally, after the transform decoding of a frame of correction data, the graphics software copies the correction data to the local graphics memory before issuing the command for the graphics controller to perform motion compensation. The process of copying the correction data to the local graphics memory generates bus cycles that can reduce playback performance.

What is needed is a method and apparatus that more efficiently uses system resources to provide better playback performance of compressed video.

SUMMARY OF THE INVENTION

A method and apparatus for decoding compressed video, the decoding of compressed video comprising the steps of decoding a first portion of a first frame to produce a first data; generating a first signal; performing motion compensation using the first data in response to the first signal; generating a second signal; decoding a second portion of the first frame to produce a second data in response to the second signal; generating a third signal; and performing motion compensation using the second data in response to the third signal.

DETAILED DESCRIPTION

Figure 1:
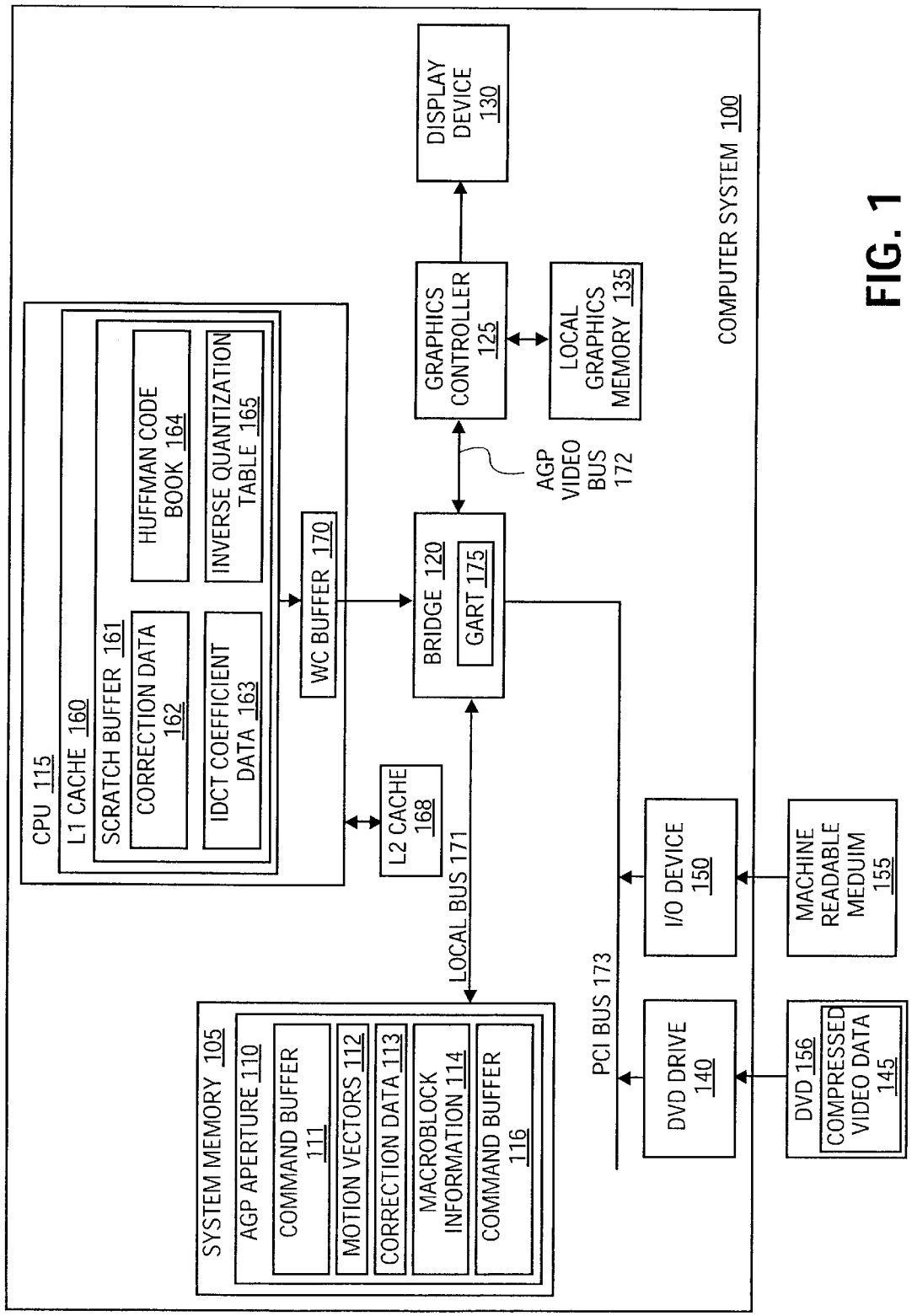
FIG. 1 illustrates one embodiment of a computer system for performing the decode of compressed video.

A method and apparatus to more efficiently perform video decoding and motion compensation to playback of compressed video, for example. In one embodiment, the present invention provides for separately decoding portions of a frame invention.

A computer system 100 includes a central processing unit (CPU) 115 that has a level 1 (L1) cache 160. A level 2 (L2) cache 168 is coupled to the CPU 115. The CPU 115 is coupled through a bridge 120 to a local bus 171, an advanced graphics port (AGP) video bus 172, and a peripheral component interface (PCI) bus 173. A system memory 105 is coupled to the local bus 171. A display device 130 and a local graphics memory are coupled through a graphics controller 125 to the AGP video bus 172. A digital video disk (DVD) drive 140 is coupled to receive compressed video data 145 stored on a digital video disk (DVD) 156. An input/output (I/O) device 150 is coupled to the PCI bus 173 to receive programs and information from a machine readable medium 155. In an alternative embodiment, compressed video may be retrieved from the machine readable medium 155 coupled to the I/O device 150.

In one embodiment, the machine readable medium 155 is a magnetic medium such as a floppy disk, hard disk, or tape cartridge. In another embodiment, the I/O device 150 is a network interface device and the machine readable medium 155 is a network, such as a local area network (LAN). In yet another embodiment, the machine readable medium 155 is an electromagnetic carrier wave in which a signal is embedded and the I/O device 155 is a device capable of extracting the signal from the electromagnetic carrier wave. It will be apparent to one skilled in the art that the machine readable medium 155 may be any medium capable of carrying information that can be read by the I/O device 150. In one embodiment, the machine readable medium 155 stores the software used to perform the method of the present invention. Alternatively, the machine readable medium 155 stores the compressed video 145.

In one embodiment, a scratch buffer 161 contains a relatively small amount of data that is frequently accessed while decompressing a relatively large block of compressed video. For example, the scratch buffer may contain a transform coefficient table used to transform blocks of the compressed video.

The L1 cache 160 stores the scratch buffer 161 that includes correction data 162, an IDCT coefficient table 163, a Huffman code book 164, and an inverse quantization table 165. In one embodiment, the correction data 162 includes only one macroblock. In another embodiment, the correction data 162 includes several macroblocks.

In one embodiment, the number of macroblocks selected for each decoding step is selected such that the scratch buffer 161 can be stored in its entirety in the L1 cache 160. By using a scratch buffer 161 that fits in its entirety in the L1 cache 160, the decode software can decode the selected macroblocks with a better cache hit rate. Decode performance generally improves when a better cache hit rate is achieved.

In one embodiment, the entire scratch buffer 161 is not stored in the L1 cache 160. For example, part of the scratch buffer 161 may be stored in the L1 cache 160 and the other part of the scratch buffer 161 may be stored in the L2 cache 168. In yet another embodiment, part of the scratch buffer 161 may be stored in the system memory 105. The performance of the decode operation generally is a function of how much of the scratch buffer 161 fits in the L1 cache and whether there are any other bus cycles that expel portions of the scratch buffer 161 from the L1 cache 160.

The data included in the scratch buffer 161 is not limited to data for a particular compression/decompression technique. Furthermore, these compression/decompression standards may employ different numerical methods, such as a wavelet transform. In one embodiment, the scratch buffer 161 includes a wavelet transform coefficient table for a wavelet transform. Other transform techniques and data may be used. In one embodiment, the system memory 105 includes an AGP aperture 110. The bridge 120 includes a graphics address remapping table (GART) 175 that are dedicated for the graphics controller 125 and the CPU 115 to access of the AGP aperture 110. The CPU 115 uses the write combining (WC) buffer 170 to store the output of the transform decode operation in the AGP aperture 110 in a command buffer 111 that includes motion vectors 112, correction data 113, and macroblock information 114. In one embodiment, the macroblock information 114 includes the discrete cosine transform (DCT) type, the macroblock type, the motion prediction type, and the coded block pattern. Other information may be included in the macroblock information. Since the CPU 115 issues the output operations as non-cacheable and utilize the WC buffer 170, the contents of the L2 cache 168 are not disturbed by these output operations. The AGP aperture may include other command buffers, such as a command buffer 116.

Either the decoder software or the graphics software copies a portion of the the correction data 162 in the L1 cache 161 to the correction data 113 in the command buffer 111. The correction data 162 corresponds to one or more macroblocks of compressed video data. In one embodiment, the correction data 162 is stored in its entirety in the L1 cache 160. Thus, when software performs the data copy to the correction data 113, references to correction data 162 result in cache hits. Thus, the present invention avoids redundant retrievals of correction data 162 from the L2 cache 168 or the system memory 105. Alternatively, some references to correction data 162 may result in cache misses because a portion of the correction data 162 is not in the L1 cache 160.

Figure 2:
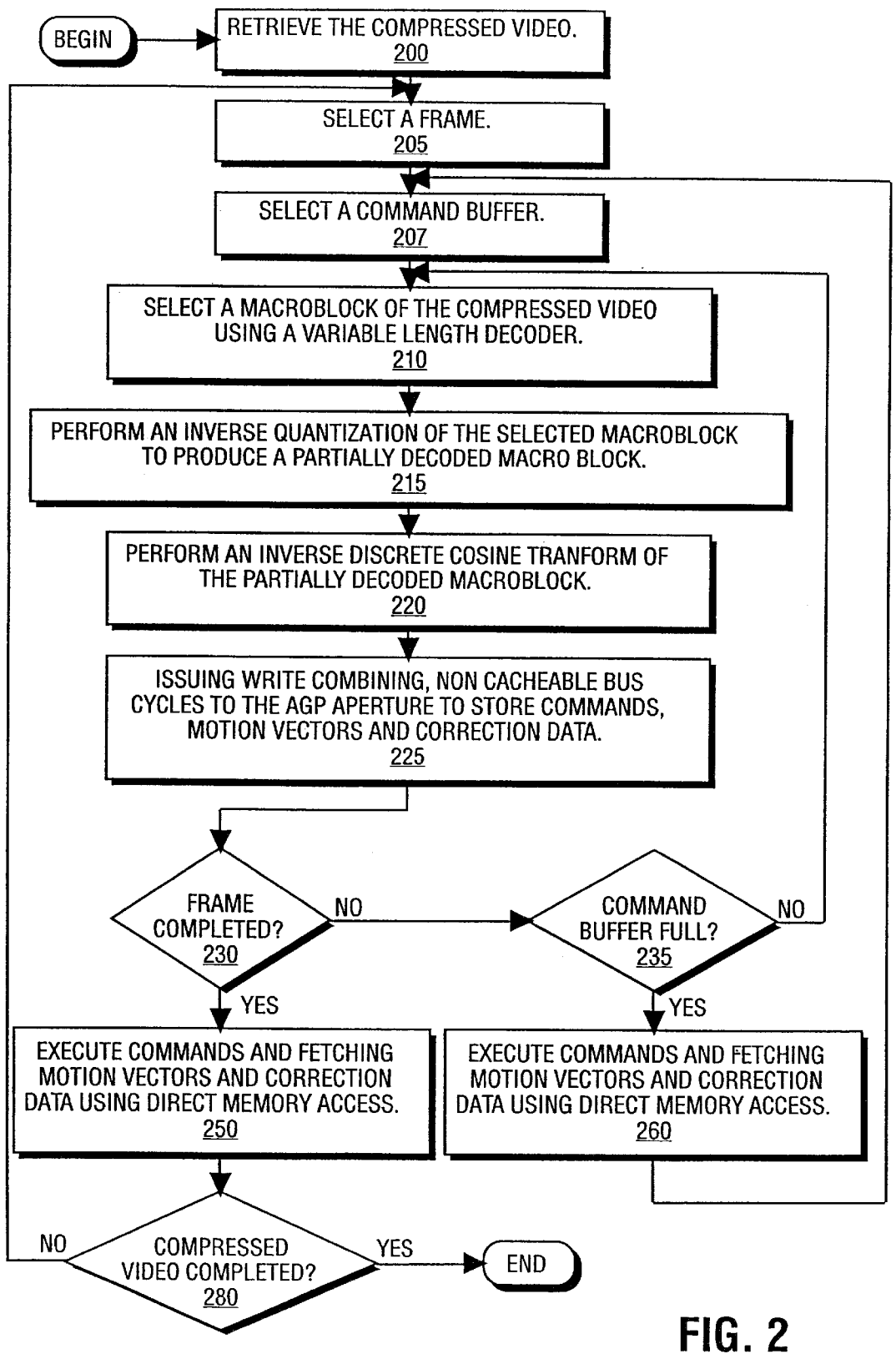
FIG. 2 illustrates one embodiment of a method of performing a decode of compressed video.

FIG. 2 illustrates one embodiment of a method of the present invention. The method is described with reference to the computer system 100 of FIG. 1. The CPU 115 executes the decoder software and the graphics software and the graphics controller 125 executes the commands in the command buffer 111 by direct memory access (DMA). Other devices may be used to perform the method of the present invention.

In step 200, the decoder software retrieves the compressed video data 145. In one embodiment, the decoder software retrieves the compressed video data 145 from the DVD 156 through the DVD drive 140 and stores the compressed video 145 in the system memory 105.

In step 205, the decoder software selects a frame of the compressed video 145. Generally, each frame is selected sequentially as decoded from the compressed video 145 according to the frame order specified in the compressed video data. Other methods of selecting a frame may be used.

In step 207, the graphics software selects a command buffer from multiple command buffers in the AGP aperture 110. In one embodiment, the graphics controller 125 executes commands from one buffer while the decoder software fills another command buffer. In one embodiment, the graphics software considers different characteristics of each buffer, such as buffer size, in determining which buffer to select. It will be apparent to one skilled in the art that numerous buffer configurations may be used and that numerous selection criterea may be used to select the command buffer.

In step 210, the decoder software selects a macroblock of a frame of the compressed video 145. Each macroblock includes 6 blocks of 8 picture element (pixel) by 8 pixel regions of the frame. Four of the 6 blocks are luminance (Y) blocks and two of the 6 blocks are chrominance (U and V) blocks. The display characteristics of each pixel is defined with 8-bit precision. In one embodiment, the macroblock is identified by variable length decoding of the compressed video data 145 using the Huffman code book 164 stored in the scratch buffer 161.

In one embodiment, the macroblocks are selected sequentially as they are decoded from the compressed video data 145. Alternatively, some macroblocks may be skipped according to MPEG2 standards such that a subsequent macroblock is selected. The correction data corresponding to a skipped macroblock is not copied from the scratch buffer 161 to the command buffer 111. Compensation for the skipped macroblocks can be performed with a single command with variable macroblock pixel width. Other methods of selecting particular macroblocks for processing may be used.

In one embodiment, any block that has zero values may be skipped. The command associated with that macroblock includes coded block pattern information identifying the which of the 6 blocks are skipped. Thus, the blocks having zero values are not copied from the scratch buffer 161 to the command buffer 111. The ability to handle skipped blocks and skipped macroblocks makes more of the command buffer available and avoids the bus cycles associated with copying the skipped data from the scratch buffer 161 to the command buffer 111.

Alternatively, the characteristics of a macroblock within a frame may be selected according to different standards. For example, the number of blocks, the pixel width and height of each block, and the size of the pixel elements may be different than described herein.

In step 215, the decoder software performs an inverse quantization using the inverse quantization table 165 and the output of the variable length decoding. In step 220, the decoder software performs an IDCT using the IDCT coefficient table 163 and the output of the inverse quantization to produce the correction data 162. In one embodiment, the correction data 162, the IDCT coefficient table 163, the Huffman code book 164, and the inverse quantization table 165 are contained in a scratch buffer 161. The number of macroblocks to be decoded in steps 210, 215, and 220 is selected such that the scratch buffer 161 fits in the L1 cache 160.

In other embodiments, other decoding methods may be used to decode the macroblock of the frame. For example, a wavelet transform may be performed during the decode process. In addition, other arrangements of pixels may be used to define each macroblock. Other size data elements may be used to define each pixel. Furthermore, two or more macroblocks of the frame may be decoded in steps 210, 215, and 220

In step 225, the graphics software generates commands that includes macroblock information, motion vectors and correction data corresponding to the output of the decoding process by issuing write combining, non-cacheable bus cycles to the AGP aperture 110 through the WC buffer 170. Since the graphics software issues bus cycles that are non-cacheable, the contents of the L1 cache 160 and the L2 cache 168 are not disturbed. Since the graphics software issues bus cycles that are write combined, writes to the same cache line are combined in the WC buffer 170 before being issued to the local bus 171 so that more efficient use of the local bus 170 is achieved. The commands are written to the command buffer 111. The motion vectors are written to the motion vectors 112 and the correction data 162 are written to the correction data 113.

In one embodiment, the commands are generated by the decoder software that calls functions in the graphics software using a standard application program interface (API) that is independent of the specific hardware implementation. The decoder software uses the API as a standard interface to the graphics software to access a command buffer that resides in a hardware specific AGP memory. Thus, a single implementation of decoder software may be used with computer systems from different graphics controller hardware vendors. In one embodiment, the graphics software is a hardware specific device driver. Generally, the hardware manufacturer or the operating system vendor provides hardware specific device drivers.

The API is defined to provide an interface between the decoder software and the graphics software at the macroblock level. A common macroblock data structure is shared between the decoder software and the graphics software. Alternatively, the decoder software may directly access the hardware specific AGP memory. This alternative may be used, for example, when the decoder software is developed for specific graphics controller hardware.

In step 230, the graphics software receives information from the decoder software if the frame is completed. If the decoder software informs the graphics software that the frame is completed, the graphics software issues a special command to the graphics controller 125 to perform step 250. If the decoder software does not inform the graphics software that the frame is completed, the graphics software performs step 235.

The graphics software also checks for the completion of the execution of the command buffer by the graphics controller. In one embodiment, the graphics software provides status information to the decoder software, such as how much of the compressed frame has been processed by the graphics software. For example, the graphics software may provide the number of macroblocks processed, the percentage of the frame decoded, or some other indicator of the progress of the graphics software.

In one embodiment, the graphics controller 125 issues a hardware interrupt signal that starts the graphics software check of the command buffer execution. In another embodiment, the graphics controller 125 writes the status information to a location in the system memory 105 by DMA and the graphics software reads this status information upon request by the decoder software. In yet another embodiment, the graphics controller 125 updates a status register for the graphics software to read upon request by the decoder software.

In step 235, the graphics software determines if the command buffer 111 is full. If the command buffer 111 is full, the graphics software issues a special command to the graphics controller 125 to perform step 260. If the command buffer 111 is not full, the graphics controller performs step 210 to select a new macroblock.

In step 250, the graphics software issues a command to the graphics controller 125 to perform motion compensation by executing the commands from the command buffer 111 and fetching the motion vectors and correction data using DMA. The output of the motion compensation is written to the local graphics memory 135. When the graphics software completes this step, control is transferred to the decoder software to perform step 280.

In step 260, the graphics software issues a command to the graphics controller 125 to perform motion compensation by executing the AGP commands from the command buffer 111 and fetching the motion vectors and correction data using direct memory access (DMA). The output of the motion compensation is written to the local graphics memory 135. Next, the graphics software performs step 207 to select a new buffer.

In step 280, the decoder software determines if the compressed video is decoded. If the compressed video is not completed, step 205 is performed to select another frame.

It will be apparent to one skilled in the art that the present invention may be applied to compressed video that is compressed according to many compression standards. Furthermore, the present invention may be applied to other compressed data standards. The present invention may be applied to other types of compressed data, such as audio data.

What is claimed is:

1. A method to decompress data within a computer system, the computer system including a CPU, a cache memory, a system memory, a hardware graphics controller, and a local graphics memory coupled to the hardware graphics controller, the method comprising:
    decoding a first portion of a first frame using the CPU to produce a first data;
    generating a first signal;
    storing the first data in the system memory, wherein the storing includes:
        identifying a portion of the first data as a write combining data type;
        storing the portion of the first data in a write combining buffer within the CPU; and
        transferring the portion of the first data from the write combing buffer to the system memory;
    transferring the first data from the system memory to the hardware graphics controller;
    performing motion compensation on the first data using the hardware graphics controller in response to generating the first signal;
    generating a second signal;
    decoding a second portion of the first frame using the CPU to produce a second data in response to generating the second signal;
    generating a third signal; and
    performing motion compensation on the second data using the hardware graphics controller in response to generating the third signal.

2. The method of claim 1 further comprising storing a portion of the first data in a command buffer, the first signal being generated in response to the command buffer being filled.

3. The method of claim 1 further comprising storing a portion of the first data in a command buffer, the first signal being generated in response to the first data being stored in the command buffer.

4. The method of claim 1 wherein the second signal is generated in response to a completion of performing the motion compensation on the first data.

5. The method of claim 1 wherein decoding a first portion of a first frame comprises:

performing variable length decoding on the first portion of the first frame to produce a first intermediate data;

performing inverse quantization on the first intermediate data to produce a second intermediate data; and performing an inverse discrete cosine transform (IDCT) on the second intermediate data to produce the first data.

6. The method of claim 1 wherein the first portion of the first frame is a macroblock.

7. The method of claim 1 wherein the first portion of the first frame comprises a plurality of macroblocks.

8. The method of claim 1 wherein storing the first data in the system memory further comprises storing the first data in a graphics aperture within the system memory through a device driver interface.

9. The method of claim 1 wherein storing the first data in the system memory further comprises issuing non-cacheable bus cycles to avoid disturbing a cache.

10. The method of claim 9 wherein the first data comprises a first correction data.

11. The method of claim 10 wherein the first data comprises a first motion vector.

12. The method of claim 11 wherein the first correction data and the first motion vector is stored using a single data stream.

13. The method of claim 11 wherein the first correction data is stored using a first data stream and the first motion vector is stored using a second data stream.

14. A computer system readable medium having stored thereon a set of instructions, wherein said set of instructions, when executed by a computer system including a CPU, a cache memory, a system memory, a hardware graphics controller, and a local graphics memory coupled to the hardware graphics controller, cause said computer system to perform a method comprising:

decoding a first portion of a first frame using the CPU to produce a first data;

generating a first signal;

storing the first data in the system memory, wherein the storing includes:

identifying a portion of the first data as a write combining data type;

storing the portion of the first data in a write combining buffer within the CPU; and transferring the portion of the first data from the write combing buffer to the system memory;

transferring the first data from the system memory to the hardware graphics controller;

performing motion compensation on the first data using the hardware graphics controller in response to generating the first signal;

generating a second signal;

decoding a second portion of the first frame using the CPU to produce a second data in response to generating the second signal;

generating a third signal; and performing motion compensation on the second data using the hardware graphics controller in response to generating the third signal.

15. The computer system readable medium of claim 14 said method further comprising storing a portion of the first data in a command buffer, the first signal being generated in response to the command buffer being filled.

16. The computer system readable medium of claim 14 said method further comprising storing a portion of the first data in a command buffer, the first signal being generated in response to the first data being stored in the command buffer.

17. The computer system readable medium of claim 14 wherein the second signal is generated in response to a completion of performing the motion compensation using the first data.

18. The computer system readable medium of claim 14 wherein decoding a first portion of a first frame comprises:

performing variable length decoding on the fist portion of the first frame to produce a first intermediate data;

performing inverse quantization on the first intermediate data to produce a second intermediate data; and performing an inverse discrete cosine transform (IDCT) on the second intermediate data to produce the first data.

19. The computer system readable medium of claim 14 wherein the first portion of the first frame is a macroblock.

20. The computer system readable medium of claim 14 wherein the first portion of the first frame comprises a plurality of macroblocks.

21. The computer system readable medium of claim 14 further comprising storing the first data in a graphics aperture in the system memory through a device driver.

22. The computer system readable medium of claim 14 wherein storing the first data in the system memory further comprises issuing non-cacheable bus cycles to avoid disturbing a cache.

23. The computer system readable medium of claim 22 wherein the first data comprises a first correction data.

24. The computer system readable medium of claim 23 wherein the first data comprises a first motion vector.

25. The computer system readable medium of claim 24 wherein the first correction data and the first motion vector is stored using a single data stream.

26. The computer system readable medium of claim 24 wherein the first correction data is stored using a first data stream and the first motion vector is stored using a second data stream.

* * * * *